(12) United States Patent
Lee et al.

(10) Patent No.: US 11,223,195 B2
(45) Date of Patent: Jan. 11, 2022

(54) CONTROL DEVICE AND METHOD FOR POWER SUPPLY TO EPS IN VEHICLE

(71) Applicant: Mando Corporation, Pyeongtaek-si (KR)

(72) Inventors: Jong Mu Lee, Yongin-si (KR); Su-Min Lee, Siheung-si (KR); Kyu Yeong Je, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 448 days.

(21) Appl. No.: 16/446,247

(22) Filed: Jun. 19, 2019

(65) Prior Publication Data

US 2019/0386484 A1    Dec. 19, 2019

(30) Foreign Application Priority Data

Jun. 19, 2018    (KR) .................. 10-2018-0070047

(51) Int. Cl.
*H02H 7/18* (2006.01)
*B62D 5/04* (2006.01)
*H02H 1/00* (2006.01)

(52) U.S. Cl.
CPC ............. *H02H 7/18* (2013.01); *B62D 5/0484* (2013.01); *H02H 1/0007* (2013.01)

(58) Field of Classification Search
CPC .. B62D 5/0481; B62D 5/0484; H02H 1/0007; H02H 11/002; H02H 3/044; H02H 7/18
See application file for complete search history.

(56) References Cited

U.S. PATENT DOCUMENTS

| 2012/0161681 A1* | 6/2012 | Kuroda | B62D 5/0481 318/400.21 |
| 2014/0055059 A1* | 2/2014 | Uryu | B62D 5/0484 318/9 |
| 2014/0055887 A1* | 2/2014 | Uryu | B62D 5/0484 361/18 |
| 2014/0229066 A1* | 8/2014 | Harada | B62D 5/046 701/41 |
| 2018/0238935 A1* | 8/2018 | Nakashima | G01R 19/003 |

* cited by examiner

*Primary Examiner* — Jared Fureman
*Assistant Examiner* — Nicolas Bellido
(74) *Attorney, Agent, or Firm* — Hauptman Ham, LLP (57) ABSTRACT

A control device and method for power supply to an EPS system in a vehicle, including a reverse voltage protection circuit and a battery disconnect circuit. A DC-end capacitor is charged with a voltage by turning on switches of a reverse voltage protection circuit and a battery disconnect circuit, a change in the voltage of the DC-end capacitor is detected by turning off the switches of the reverse voltage protection circuit and the battery disconnect circuit, and then a failure in the switches of the reverse voltage protection circuit and the battery disconnect circuit is determined on the basis of information regarding changes in the voltage of the DC-end capacitor. The failure in the reverse voltage protection circuit and the battery disconnect circuit is diagnosed without a charge/discharge circuit.

11 Claims, 7 Drawing Sheets

CONTROL DEVICE AND METHOD FOR POWER SUPPLY TO EPS IN VEHICLE

CROSS REFERENCE TO RELATED APPLICATION

This application claims priority to Korean Patent Application No. 10-2018-0070047, fled in the Republic of Korea on Jun. 19, 2018, which is hereby incorporated by reference for all purposes as if fully set forth herein.

BACKGROUND

Field

The present disclosure relates to a control device and method for power supply to an electric power steering (EPS) system in a vehicle, including a reverse voltage protection circuit and a battery disconnect circuit. More particularly, the present disclosure relates to a control device and method for power supply to an EPS system, the control device and method being able to diagnose a failure in the reverse voltage protection circuit and the battery disconnect circuit in the vehicle using a reverse voltage protection circuit and a battery disconnect circuit in a vehicle without using a charge/discharge circuit.

Description of Related Art

A battery in a vehicle is constantly connected to an electric system in the vehicle, and should be electrically disconnected as required. In this regard, a battery disconnect circuit serves to electrically disconnect the battery of the vehicle from the electric system while the battery is physically connected to the electric system. In addition, if the vehicle battery is reversely connected to the electric system in the vehicle, circuits in the vehicle may be damaged. To prevent this problem, a reverse voltage protection circuit is connected to the vehicle battery to prevent the application of a reverse voltage. The reverse voltage protection circuit and the battery disconnect circuit in the vehicle are important portions of a configuration for supplying power to an electric power steering (EPS) system. Thus, according to fail/safety regulations, failure diagnosis must be performed at least once every time the vehicle is driven.

However, there is substantially no significant difference in a turn-on operation, due to a low change point after the operation of a switch used in the reverse voltage protection circuit and the battery disconnect circuit. In a turn-off operation, no significant difference is caused due to a direct current (DC)-end capacitor having a large amount of capacitance and a constantly-connected initial charge resistor. Thus, it is difficult to determine whether or not the switch is normally turning on and turning off.

Accordingly, in the related art, an abnormality in the switch is detected using a separate charge/discharge circuit after the switch is turned off. However, a bypass circuit and a charge/discharge circuit detecting an abnormal state in the switch should be further provided, separately from the reverse voltage protection circuit and the battery disconnect circuit, thereby causing an overall circuit configuration complicated and increasing the size thereof. In addition, devices having a high resistance value are required, due to a charge/discharge time and capacitance.

BRIEF SUMMARY

Various aspects of the present disclosure provide a control device and method for power supply to an electrical power steering (EPS) system in a vehicle, the control device and method being able to diagnose a failure in a reverse voltage protection circuit and a battery disconnect circuit of the vehicle without necessity provide a separate charge/discharge circuit.

Also provided are a control device and method for power supply to an EPS system in a vehicle, the control device and method being able to diagnose a failure in the reverse voltage protection circuit and the battery disconnect circuit of the vehicle, on the basis of information regarding changes in the voltage of a direct-current (DC)-end capacitor, in response to control over the turning on and turning off of the reverse voltage protection circuit and the battery disconnect circuit of the vehicle and control over the charging and discharging operation of the DC-end capacitor.

According to an aspect of the present disclosure, a control device for power supply to an EPS system may include: a reverse voltage protection circuit connected to a vehicle battery in series to prevent application of a reverse voltage of the battery; a battery disconnect circuit connected to the reverse voltage protection circuit in series, and able to electrically disconnect the battery and the vehicle; an initial charge resistor connected to the reverse voltage protection circuit in series and connected to the battery disconnect circuit in parallel to prevent damage caused by an inrush current occurring in response to switches of the reverse voltage protection circuit and the battery disconnect circuit being turned on; a DC-end capacitor connected to the battery disconnect circuit and the initial charge resistor in series to accumulate power, supplied from the battery, as electrical energy; a controller controlling turning on and turning off of the switches of the reverse voltage protection circuit and the battery disconnect circuit and controlling charging and discharging operations of the DC-end capacitor; and a failure detector detecting a change in a voltage of the DC-end capacitor in response to the discharging operation after the charging operation and determining a failure in the switches of the reverse voltage protection circuit and the battery disconnect circuit in accordance with information regarding the voltage change.

According to another aspect of the present disclosure, a control method for power supply to an EPS system in a vehicle may include: receiving electric power from a battery of a vehicle; charge a DC-end capacitor by turning on a switch of a reverse voltage protection circuit able to prevent application of a reverse voltage of the vehicle battery and a switch of a battery disconnect circuit able to electrically disconnect the battery and the vehicle; discharging the DC-end capacitor by turning the switch of the reverse voltage protection circuit and the switch of the battery disconnect circuit off to electrically disconnect the DC-end capacitor and the battery and then consuming electric power of the DC-end capacitor; and detecting changes in a voltage of the DC-end capacitor due to the discharging after the charging and detecting a failure in the switches of the reverse voltage protection circuit and the switch of the battery disconnect circuit in accordance with information regarding the changes in the voltage of the DC-end capacitor.

According to embodiments, the control device and the for power supply to an EPS system can diagnose a failure in the reverse voltage protection circuit and the battery disconnect circuit without a separate charge/discharge circuit, thereby reducing costs and a board size and improving reliability.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms.

In the description of the positional relationship between components, it will be understood that when two or more elements are referred to as being "connected, coupled, or linked" to each other, the two or more elements not only can be "directly connected, coupled, or linked" to each other, but can also be "indirectly connected, coupled, or linked" to each other via another "intervening" element. Here, the other element may be included in one or more elements of the two or more elements "connected," "coupled," or "linked" to each other.

When temporally relative terms, such as "after," "subsequent," "following," and "before" are used to define a temporal relationship in components, an operating method, a fabrication method, or the like, a non-continuous case may be included unless the term "directly" is used.

In addition, when a numerical value or corresponding information (e.g. a level) of a component is stated, it shall be understood that the numerical value or corresponding information includes an error range that may be caused by a variety of factors (e.g. a processing factor, an internal or external impact, or noise), even in the case in which there is no explicit description thereof.

In the present disclosure, a reverse voltage protection circuit of a vehicle means a circuit preventing electric components of the vehicle from being destroyed by an erroneously-applied voltage in a case in which a battery of the vehicle is reversely connected. In addition, in the present disclosure, the battery disconnect circuit of the vehicle means a circuit serving to disconnect the battery from the vehicle to discharge the battery and electrically disconnect the battery and the vehicle. In this case, circuits having the above-described functions will be collectively referred to as the reverse voltage protection circuit and the battery disconnect circuit, but the present disclosure is not limited to these terms. In addition, the reverse voltage protection circuit and the battery disconnect circuit may belong to an EPS power supply control part according to characteristics thereof. The EPS power supply control part is directly or indirectly connected to the vehicle battery to receive electric power from the battery disposed externally thereof and then supply electric power to an electric power steering (EPS) system. Accordingly, in the EPS power supply control part to which the vehicle and the battery are connected may further include circuits having other functions, which are not illustrated in the drawings. Even in the case that the circuits having other functions are included, descriptions of normal operation and failure diagnosis of the reverse voltage protection circuit and the battery disconnect circuit may be applied substantially the same as in the case in which none of the circuits having other functions are included.

Hereinafter, a control device for power supply to an EPS system in a vehicle according to embodiments will be described with reference to the drawings.

Figure 1:
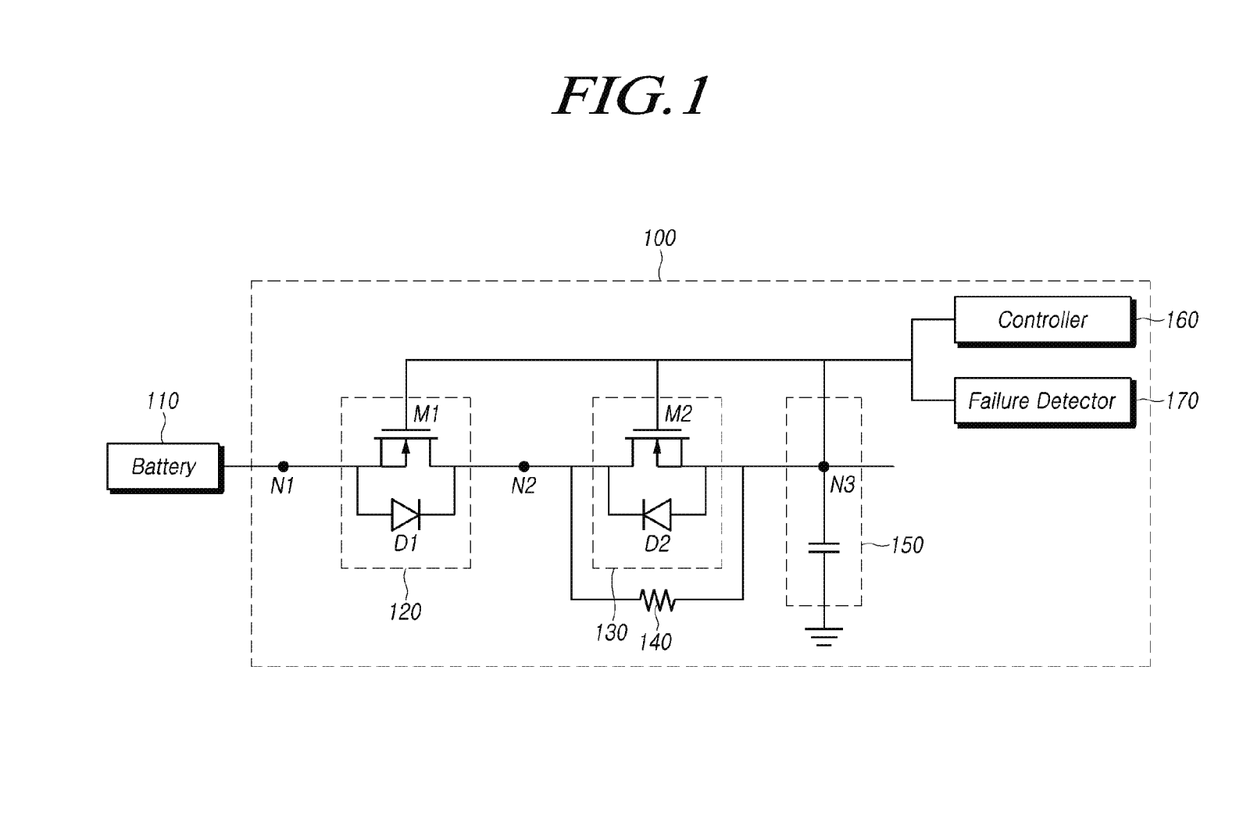
FIG. 1 illustrates a configuration of a control device for power supply to an EPS system in a vehicle according to an embodiment.

FIG. 1 illustrates a configuration of a control device for power supply to an EPS system in a vehicle according to an embodiment.

Referring to FIG. 1, the control device 100 for power supply to an EPS system in a vehicle according to an embodiment may include: a reverse voltage protection circuit 120 connected to a vehicle battery 110 in series to prevent the application of a reverse voltage of the battery 110; a battery disconnect circuit 130 connected to the reverse voltage protection circuit 120 in series, and able to electrically disconnect the battery 110 and the vehicle; an initial charge resistor 140 connected to the reverse voltage protection circuit 120 in series and connected to the battery disconnect circuit 130 in parallel to prevent damage caused by an inrush current occurring in response to switches of the reverse voltage protection circuit 120 and the battery disconnect circuit 130 being turned on; a direct current (DC)-end capacitor 150 connected to the battery disconnect circuit 130 and the initial charge resistor 140 in series to accumulate power, supplied from the battery 110, as electrical energy; a controller controlling turning on and turning off of the switches of the reverse voltage protection circuit 120 and the battery disconnect circuit 130 and controlling charging and discharging operations of the DC-end capacitor 150; and a failure detector 170 detecting a change in the voltage of the DC-end capacitor 150 in response to the discharging operation after the charging operation and determining a failure in the switches of the reverse voltage protection circuit 120 and the battery disconnect circuit 130 on the basis of information regarding the voltage change.

Here, the battery 110 is connected to the reverse voltage protection circuit 120 in series, which in turn is connected in series to the battery disconnect circuit 130. The initial charge resistor 140, preventing circuits from being damaged by an inrush current induced when the switches are turned on, is connected to the reverse voltage protection circuit 120 in series and to the battery disconnect circuit 130 in parallel. The DC-end capacitor 150 is connected to the battery disconnect circuit 130 and the initial charge resistor 140 in series. The controller 160 is connected to the reverse voltage protection circuit 120 and the battery disconnect circuit 130. Although not shown in FIG. 1, the controller 160 may be connected to an external inverter, a gate driver for operating the inverter, or the like, in order to consume electric power of the DC-end capacitor 150. In this case, the external inverter may be connected to the DC-end capacitor 150 in parallel, and may serve as a power source to control a vehicle motor using energy input from the DC-end capacitor 150. In addition, the failure detector 170 may be directly or indirectly connected to the DC-end capacitor 150 to detect a voltage of the DC-end capacitor 150 or receive information regarding the voltage of the DC-end capacitor 150.

The reverse voltage protection circuit 120 according to an embodiment includes a switch M1 and a diode D1, connected in parallel. In an example, the switch M1 may be implemented as a transistor. In addition, the transistor of the switch M1 may be implemented as a metal-oxide-semiconductor field-effect transistor (MOSFET) device. In addition, the switch M1 may be turned on to be short-circuited and be turned off to be opened by a control signal input thereto. In addition, the diode D1 of the reverse voltage protection circuit 120 may be configured using a direction from a first node N1 to a second node N2 as a forward direction. In addition, the reverse voltage protection circuit 120 is connected to the battery 110 in series at the first node N1.

Although the switch M1 and the diode D1 are illustrated as components of the reverse voltage protection circuit 120 in FIG. 1, the present disclosure is not limited thereto. Another device, such as a resistor, for stabilization and efficiency, may be included in the reverse voltage protection circuit 120. However, even in the case that the other device is included, the direction of the current flowing in response to the turning on and turning off of the switch M1, in a normal operation and a failure diagnosis operation of the reverse voltage protection circuit 120, may be the same as in the case in which the other is not included.

The battery disconnect circuit 130 according to an embodiment includes a switch M2 and a diode D2, connected in parallel. In an example, the switch M2 may be implemented as a transistor. In addition, the transistor of the switch M2 may be implemented as an MOSFET device. In addition, the switch M2 may be turned on to be short-circuited and be turned off to be opened by a control signal input thereto. In addition, the diode D2 of the battery disconnect circuit 130 may be configured using a direction from a third node N3 to the second node N2 as a forward direction. In addition, the battery disconnect circuit 130 is connected to the initial charge resistor 140 in parallel between the second node N2 and the third node N3.

Although the switch M2 and the diode D2 are illustrated as components of the battery disconnect circuit 130 in FIG. 1, the present disclosure is not limited thereto. Another device, such as a resistor, for stabilization and efficiency, may be included in the battery disconnect circuit 130. However, even in the case that the other device is included, the direction of the current flowing in response to the turning on and turning off of the switch M2, in a normal operation and a failure diagnosis operation of the battery disconnect circuit 130, may be the same as in the case in which other device is not included.

The initial charge resistor 140 according to an embodiment may include a resistance element. The initial charge resistor 140 is a resistance element protecting the circuit from being damaged by an inrush current, i.e. a current higher than a steady state current flowing at a point in time at which electric power is input to an electronic device. The initial charge resistor 140 may have a high resistance value. The initial charge resistor 140 is connected to the battery disconnect circuit 130 in parallel at the second node N2 and the third node N3, and is connected to the reverse voltage protection circuit 120 in series at the second node N2. The initial charge resistor 140 is connected to the DC-end capacitor 150 in series at the third node N3.

The DC-end capacitor 150 according to an embodiment may include a capacitance device. The DC-end capacitor 150 is connected to the battery disconnect circuit 130 and the initial charge resistor 140 in series at the third node N3. The DC-end capacitor 150 may be charged with electric power input from the battery 110, in response to a turn-on operation of the switches of the reverse voltage protection circuit 120 and the battery disconnect circuit 130, and may be discharged by a turn-off operation or by consuming electric power. Here, the operation of the DC-end capacitor 150, in response to the charging and discharging operations, will be more specifically described later with reference to FIGS. 2 to 5.

The controller 160 according to an embodiment may performing the operation of charging and discharging the DC-end capacitor 150 by controlling turning on and turning off of the switches of the reverse voltage protection circuit 120 and the battery disconnect circuit 130 and controlling power consumption of the DC-end capacitor 150. Here, the controller 160 may be directly or indirectly connected to the reverse voltage protection circuit 120 and the battery disconnect circuit 130 to transfer a turn on signal and a turn off signal of the switches of the reverse voltage protection circuit 120 and the battery disconnect circuit 130. In a case in which the switches of the reverse voltage protection circuit 120 and the battery disconnect circuit 130 are MOSFET devices, a signal of the controller 160 may be a gate signal. In addition, the controller 160 may control the turning on and turning off of the switches of the reverse voltage protection circuit 120 and the battery disconnect circuit 130 for the charging and discharging operations of the DC-end capacitor 150.

The charging operation of the controller 160 according to an embodiment may charge the voltage of the DC-end capacitor 150 by turning the switches of the reverse voltage protection circuit 120 and the battery disconnect circuit 130 on. The discharging operation may include turning the switches of the reverse voltage protection circuit 120 and the battery disconnect circuit 130 off to electrically disconnect the DC-end capacitor 150 and the vehicle battery 110 and then consuming electric power of the DC-end capacitor 150.

According to an embodiment, when the switches of the reverse voltage protection circuit 120 and the battery disconnect circuit 130 are turned on, the corresponding switches are short-circuited. This can cause the both-end voltage of the DC-end capacitor 150 and the both-end voltage of the vehicle battery 110 to be the same, so that the DC-end capacitor 150 can be charged. In addition, when the switches of the reverse voltage protection circuit 120 and the battery disconnect circuit 130 are turned off to be opened, the DC-end capacitor 150 and the vehicle battery 110 may be electrically disconnected. In addition, the controller 160 may operate the inverter or pseudo-drive the gate driver for operating the inverter in order to consume electric power of the DC-end capacitor 150. Specific operations of the DC-end capacitor 150 in response to the charging and discharging operations will be more specifically described later with reference to FIGS. 2 to 5.

The failure detector 170 according to an embodiment may detect a change in the voltage of the DC-end capacitor 150, in response to the discharging operation after the charging operation of the controller 160, and determine a failure in the switches of the reverse voltage protection circuit 120 and the battery disconnect circuit 130, on the basis of information regarding the voltage change of the DC-end capacitor 150. This is because, after the reverse voltage protection circuit 120 and the battery disconnect circuit 130 are turned off and the switches are thus opened, a current may be induced from the battery 110 via the initial charge resistor 140 when electric power of the DC-end capacitor 150 is used, and the voltage change of the DC-end capacitor 150 may have different aspects, depending on a failure in the reverse voltage protection circuit 120 and the battery disconnect circuit 130. That is, if the switch is normal, the switch is opened, so that a voltage drop may occur in the DC-end capacitor 150 in response to power consumption. However, if the switch has failed, the switch is short-circuited, so that the voltage of the battery 110 and the voltage of the DC-end capacitor 150 may be maintained to be the same, and thus a voltage drop may not occur despite power consumption.

In this case, the failure detector 170 may be directly or indirectly connected to the DC-end capacitor 150 to detect a both-end voltage of the DC-end capacitor 150 or receive corresponding information. In addition, the failure detector 170 may receive a signal regarding the execution of the charging and discharging operations of the controller 160.

In addition, in a case in which the controller 160 according to an embodiment performs the discharging operation for a predetermined detection period after the charging operation, if the voltage of the DC-end capacitor 150 is maintained at a voltage obtained in the charging operation, the failure detector 170 may determine that the switches of the reverse voltage protection circuit 120 and the battery disconnect circuit 130 have failed.

In another example, in a case in which the controller 160 performs the discharging operation for the predetermined detection period after the charging operation, with a voltage drop occurring in the DC-end capacitor 150 during the discharging operation, the failure detector 170 may determine that the switches of the reverse voltage protection circuit 120 and the battery disconnect circuit 130 are in a normal state. In this case, the voltage drop in the DC-end capacitor 150 may be determined on the basis of the value of voltage of the DC-end capacitor 150 charged in the charging operation, at a predetermined ratio. In addition, in an example, the predetermined detection period may be calculated using information regarding the power consumption per unit hour of the DC-end capacitor 150, instant power, the capacitance of the DC-end capacitor 150, the state of charge, and the like, so as to be set as a shortest period of time in which the voltage drop of the DC-end capacitor 150 can be recognized. Since the shortest period of time, in which the voltage drop of the DC-end capacitor 150 is recognizable, can be calculated from other information regarding the DC-end capacitor 150 and the controller 160, information used for calculating the shortest period of time is not limited to the power consumption per unit hour of the DC-end capacitor 150, the capacitance of the DC-end capacitor 150, and the state of charge.

Accordingly, the failure detector 170 may operate differently depending on a failure in the switches of the reverse voltage protection circuit 120 and the battery disconnect circuit 130. The operation of the failure detector 170, depending on the failure in the switches of the reverse voltage protection circuit 120 and the battery disconnect circuit 130 has failed, will be more specifically described later with reference to FIGS. 5 and 6.

Figure 7:
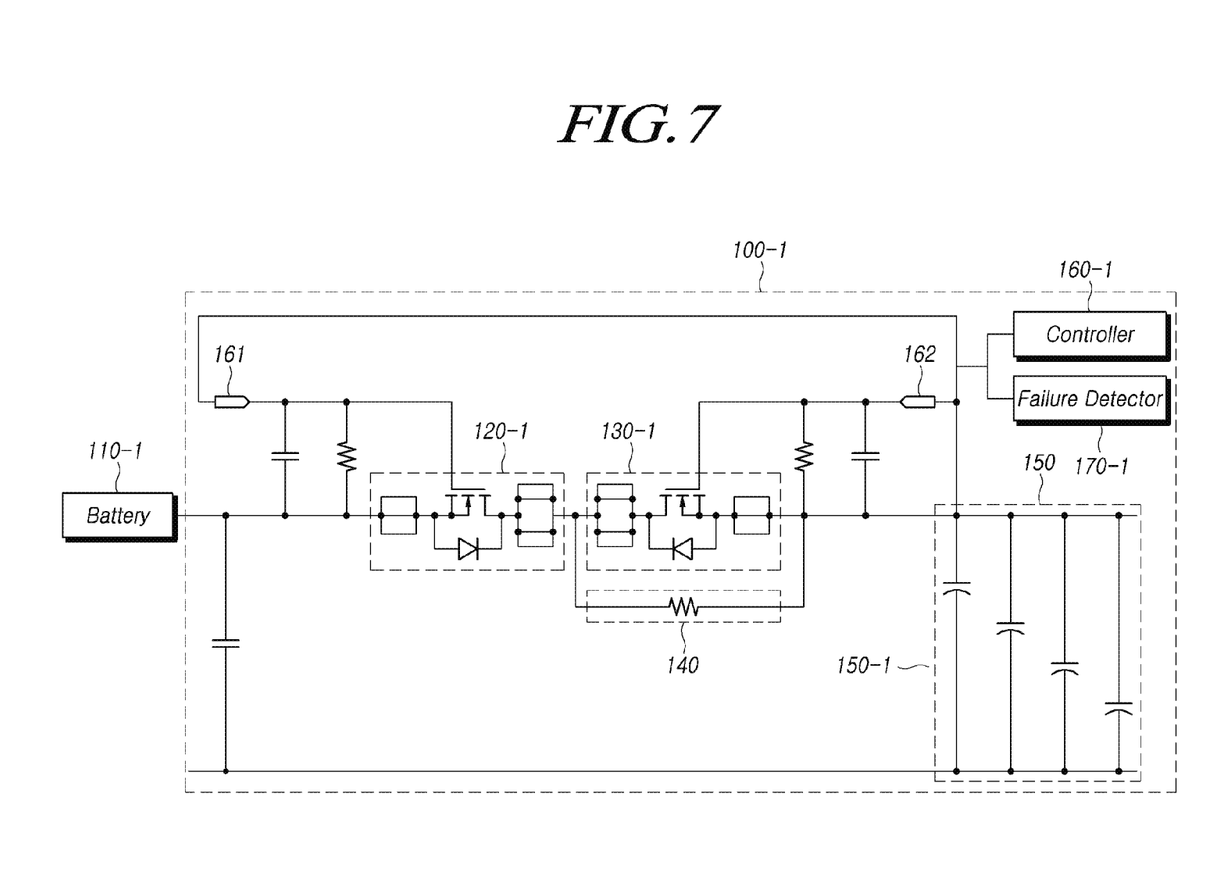
FIG. 7 is a circuit diagram illustrating a specific structure of the control device for power supply to an EPS system in a vehicle according to an embodiment.

FIG. 7 is a circuit diagram illustrating a specific structure of the control device for power supply to an EPS system in a vehicle according to an embodiment.

Referring to FIG. 7, the control device 100-1 for power supply to an EPS system may be connected to the battery 110-1. In addition, the reverse voltage protection circuit 120-1 and the battery disconnect circuit 130-1 may be connected in series. Other components, in addition to the switch and the diode, may be provided in the circuits. In addition, the reverse voltage protection circuit 120-1 may be connected to a first control signal transmitter 161 able to receive a control signal, and the battery disconnect circuit 130-1 may be connected to a second control signal transmitter able to receive a control signal. The switch of the reverse voltage protection circuit 120-1 may be turned on and off by a control signal received from the first control signal transmitter 161. Likewise, the switch of the battery disconnect circuit 130-1 may be turned on and off by a control signal received from the second control signal transmitter 162. A resistor or a capacitance device may be included in the first control signal transmitter 161 and the reverse voltage protection circuit 120-1. Likewise, a resistor or a capacitance device may be included in the second control signal transmitter 162 and the battery disconnect circuit 130-1. In addition, the DC-end capacitor 150-1 may be comprised of a plurality of capacitors.

On the basis of the operation of the controller 160-1 and the failure detector 170-1 as described above, the control device 100-1 for power supply to an EPS system may detect a failure in the switches of the reverse voltage protection circuit 120-1 and the battery disconnect circuit 130-1.

The structure illustrated in FIG. 7 is a specific example of the control device 100 for power supply to an EPS system, and the configuration of the control device 100 for power supply to an EPS system is not limited to the foregoing embodiments. The control device 100 for power supply to an EPS system may be provided as circuits equivalent to the above-described circuit or a variety of other circuits performing the same function.

As set forth above, in consideration of the above-described object, the reverse voltage protection circuit 120, the battery disconnect circuit 130, the initial charge resistor 140, the DC-end capacitor 150, the controller 160, and the failure detector 170 of the control device 100 for power supply to an EPS system may be provided as one or more microprocessors operating according to a set program. The set program may include a series of instructions to perform respective steps included in a control method for power supply to an EPS system according to an embodiment, which will be described later.

The configuration and operation of each of the circuits of the control device 100 for power supply to an EPS system in a vehicle, including the reverse voltage protection circuit 120 and the battery disconnect circuit 130, have been briefly described hereinabove. Hereinafter, specific operations of the control device 100 for power supply to an EPS system will be described with reference to FIGS. 2 to 5.

Figure 2:
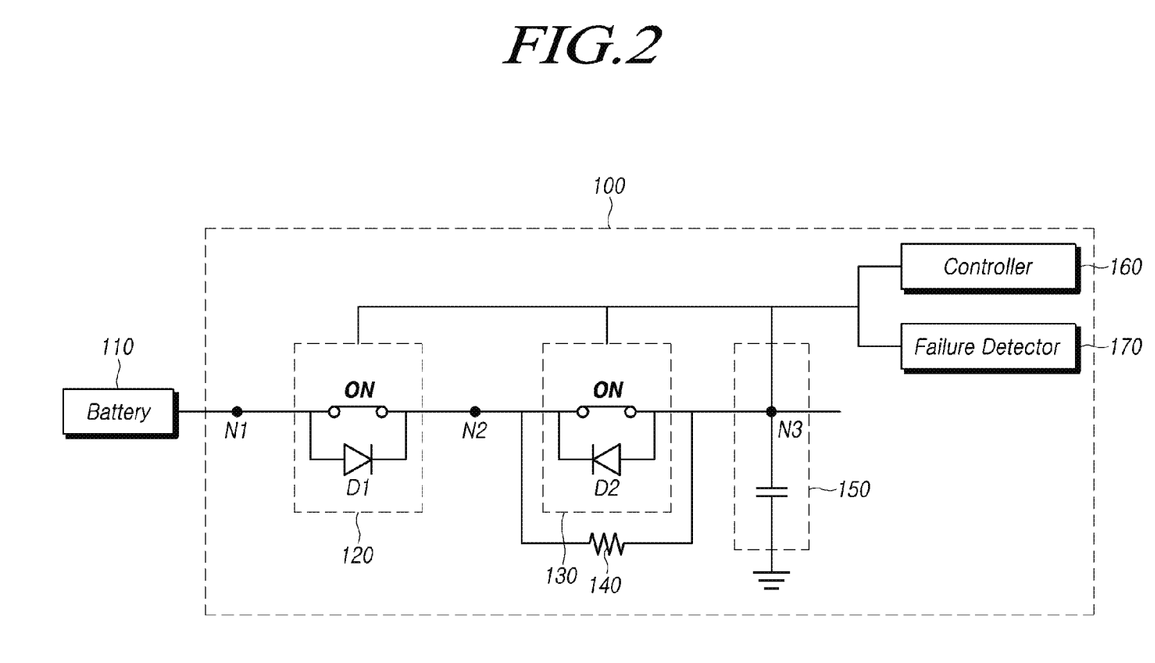
FIG. 2 illustrates the charging operation of the controller according to an embodiment.

FIG. 2 illustrates the charging operation of the controller according to an embodiment.

Referring to FIG. 2, the controller 160 may charge the DC-end capacitor 150 by turning on the switch M1 of the reverse voltage protection circuit 120 and the switch M2 of the battery disconnect circuit 130.

That is, in a case in which the switch M1 of the reverse voltage protection circuit 120 is turned on by the operation of the controller 160, the corresponding switch M1 is short-circuited, and the first node N1 and the second node N2 have the same potential difference. Likewise, in a case in which the switch M2 of the battery disconnect circuit 130 is turned on by the operation of the controller 160, the corresponding switch M2 is short-circuited, and the second node N2 and the third node N3 have the same potential difference. As a result, the potential differences of the first node N1 and the third node N3 from the ground potential are the same, and the voltage of the DC-end capacitor 150 from the ground potential is the same as the voltage of the battery 110, so that the DC-end capacitor 150 can be charged immediately.

Accordingly, the voltage of the DC-end capacitor 150 according to an embodiment is the same as the voltage of the battery 110 after the charging step, irrespective of the voltage value of the DC-end capacitor 150 directly before the charging step.

Figure 3:
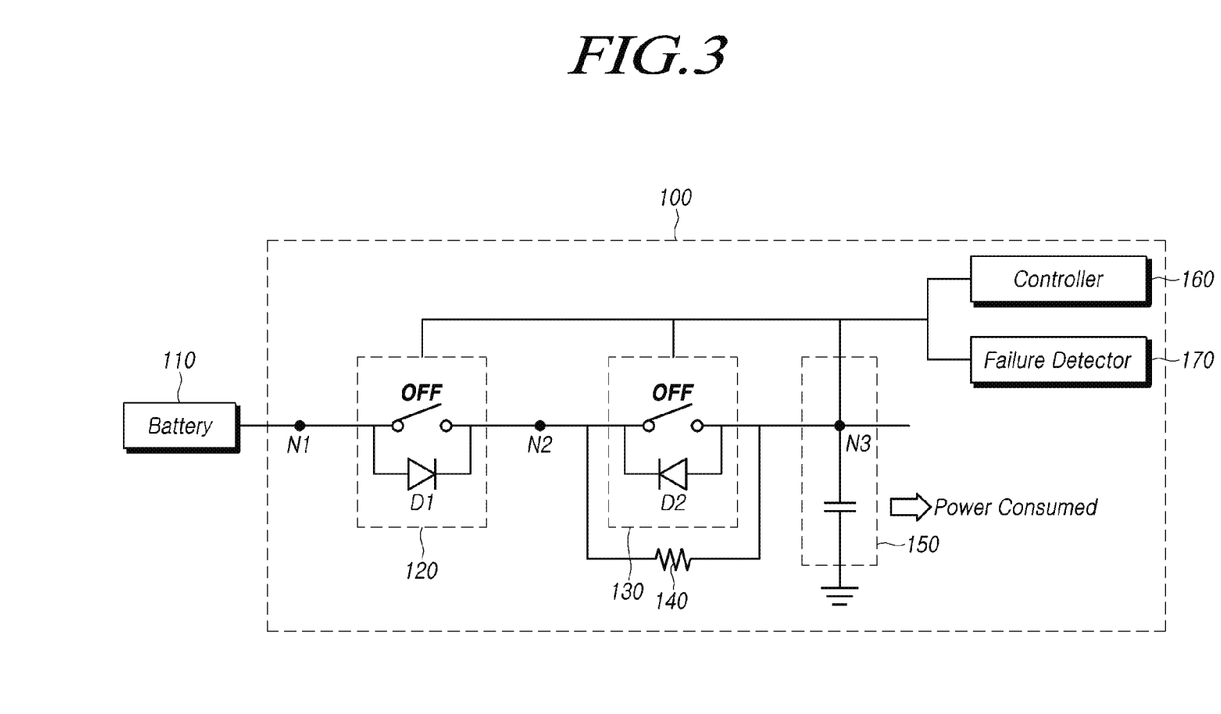
FIG. 3 illustrates the discharging operation of the controller according to an embodiment.

FIG. 3 illustrates the discharging operation of the controller 160 according to an embodiment.

Referring to FIG. 3, the controller 160 may electrically disconnect the DC-end capacitor 150 and the battery 110 by turning the switch M1 of the reverse voltage protection circuit 120 and the switch M2 of the battery disconnect circuit 130 off. That is, when the controller 160 turns the switch M1 of the reverse voltage protection circuit 120 off, the switch M1 is opened. When the switch M2 of the battery disconnect circuit 130 is turned off, the switch M2 is opened.

In addition, the controller 160 may control electric power of the DC-end capacitor 150 to be consumed. The controller 160 according to an embodiment may perform the discharging operation by turning the switches of the reverse voltage protection circuit 120 and the battery disconnect circuit 130 off and then consuming electric power of the DC-end capacitor 150. In this regard, the controller 160 according to an embodiment may pseudo-drive the inverter connected to the DC-end capacitor 150 or the gate driver for operating the inverter. It should be understood, however, that the pseudo-driving of the inverter or the gate driver is merely illustrative of the use of electric power of the DC-end capacitor 150, and a method of driving the vehicle motor or driving another electronic control unit connectable to the DC-end capacitor 150 may be used in order to consume electric power of the DC-end capacitor 150.

In this case, a change in the voltage of the DC-end capacitor 150 varies depending on the failure of the reverse voltage protection circuit 120 and the battery disconnect circuit 130. Accordingly, the failure detector may detect a failure by detecting the voltage change of the DC-end capacitor 150.

Hereinafter, changes in the voltage of the DC-end capacitor 150, depending on the failure in the switches of the reverse voltage protection circuit 120 and the battery disconnect circuit 130, will be described in greater detail.

Figure 4:
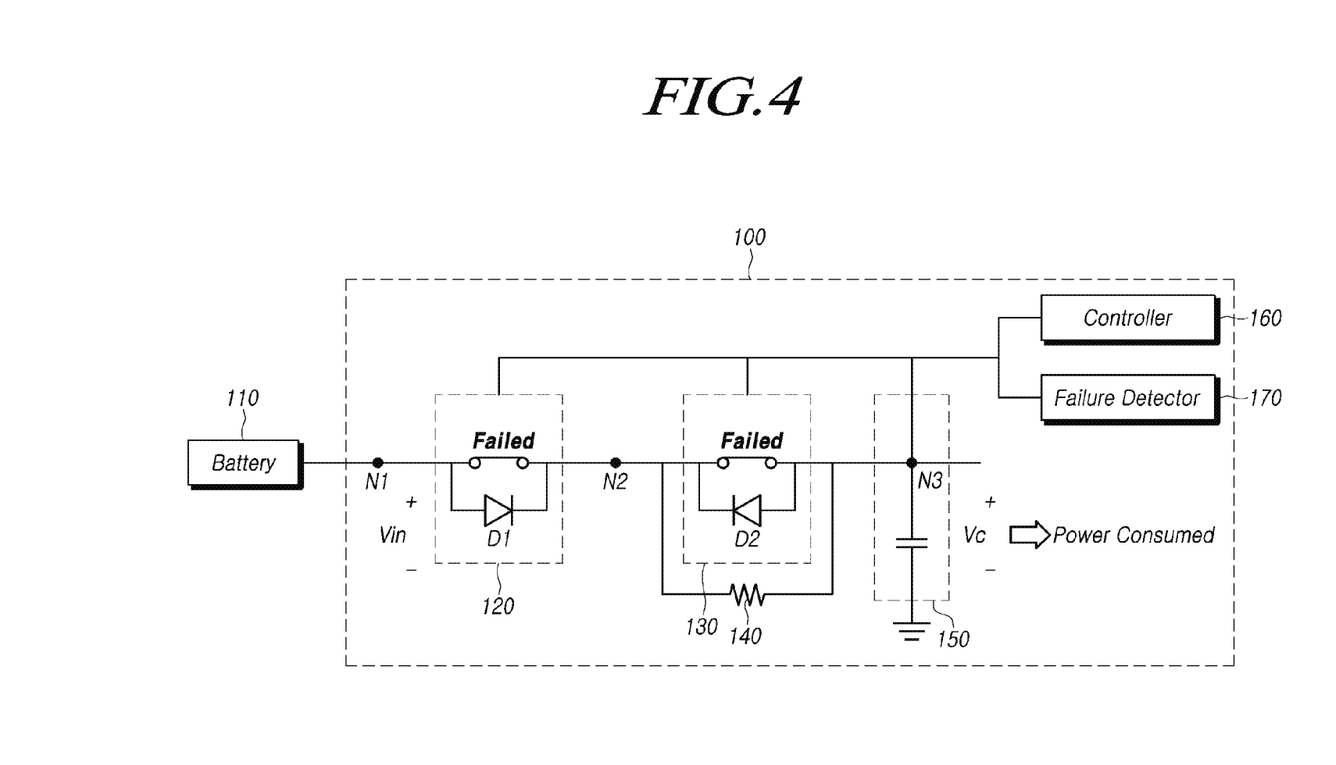
FIG. 4 illustrates the operation of the failure detector in a situation in which the switches of the reverse voltage protection circuit and the battery disconnect circuit according to an embodiment have failed.

FIG. 4 illustrates the operation of the failure detector in a situation in which the switches of the reverse voltage protection circuit and the battery disconnect circuit according to an embodiment have failed.

Referring to FIG. 4, in a case in which the switches of the reverse voltage protection circuit 120 and the battery disconnect circuit 130 have failed, the voltage of the DC-end capacitor 150 may not be changed even in the case that the DC-end capacitor 150 consumes electric power in the discharging operation. In this case, the failure detector 170 can determine that the switches of the reverse voltage protection circuit 120 and the battery disconnect circuit 130 have failed.

Specifically, in a case in which the switches of the reverse voltage protection circuit 120 and the battery disconnect circuit 130 have failed, the switches are short-circuited instead of operating properly. However, the controller 160 controls both the switches of the reverse voltage protection circuit 120 and the battery disconnect circuit 130 to be in a turned-off state, i.e. an open state, in order to detect a failure. Afterwards, the failure detector 170 detects a change in the voltage of the DC-end capacitor 150. Thus, if the changed voltage of the DC-end capacitor 150 is the same as a result value of the case in which a switch is opened, the corresponding switch may be determined to be normal. In contrast, if the change in the voltage of the DC-end capacitor 150 is different from a result value of the open state, the switches of the reverse voltage protection circuit 120 and the battery disconnect circuit 130 may be determined as having failed. That is, if the failure detector 170 detects a result value indicating the reverse voltage protection circuit 120 and the battery disconnect circuit 130 having failed during the discharging operation after the charging operation, the failure detector 170 may determine that the switches of the reverse voltage protection circuit 120 and the battery disconnect circuit 130 have failed, since the corresponding switches are not turned off.

In this case, if the switches of the reverse voltage protection circuit 120 and the battery disconnect circuit 130 have failed, the resultant state may be the same as the charging operation of the controller 160. That is, as described above, in a case in which the switches of the reverse voltage protection circuit 120 and the battery disconnect circuit 130 are turned on, both the corresponding switches are short-circuited. This state is the same as the state of the circuit diagram in which both the switches are turned on in the charging operation. In this case, as described above, the first node N1 and the third node N3 may have the same potential difference, and a voltage Vc of the DC-end capacitor 150 from the ground potential may be the same as a voltage Vin of the battery 110. As a result, the voltage Vc of the DC-end capacitor 150 may be the same as the input voltage Vin of the battery 110, irrespective of the use of electric power of the DC-end capacitor 150.

Accordingly, in a case in which the voltage Vc of the DC-end capacitor 150 is maintained at a voltage charged in the charging operation although the discharging operation has been performed for a predetermined detection period after the charging operation, the DC-end capacitor 150 may determine that the switches of the reverse voltage protection circuit 120 and the battery disconnect circuit 130 are short-circuited so that electric power is continuously supplied by the battery 110. That is, due to control over the reverse voltage protection circuit 120 and the battery disconnect circuit 130, it can be appreciated that the electric system in the vehicle and the vehicle battery 110 are not disconnected. This may mean the reverse voltage protection circuit 120 and the battery disconnect circuit 130 do not operate properly, and consequently, the reverse voltage protection circuit 120 and the battery disconnect circuit 130 may be determined as having failed. Here, regarding the maintenance of the charged voltage, even in the case that the switches of the reverse voltage protection circuit 120 and the battery disconnect circuit 130 have failed, the charged voltage may be reduced by a certain amount due to the consumption of the voltage of the battery 110, the resistance of electrical lines, or internal resistance of the DC-end capacitor 150, and thus an error may be taken into account.

In addition, the predetermined detection period according to an embodiment may be previously set by an operator, or may vary depending on the current state of the vehicle, e.g. information regarding the state of the battery, a vehicle speed, a failure of another device, and the like. Alternatively, the predetermined detection period may be set to be a shortest period, in which a significant difference is recognizable, by calculating the amount of electric power consumed by the DC-end capacitor 150. In this case, the amount of electric power of the DC-end capacitor 150 consumed in the discharging operation and the capacity and state of charge of the DC-end capacitor 150 may be used to calculate the amount of electric power consumed by the DC-end capacitor 150. That is, there is no limitation on the predetermined detection period as long as the detection period can be a reference period for failure detection.

In this manner, the failure detector 170 according to an embodiment can determine a failure in the switches of the reverse voltage protection circuit 120 and the battery disconnect circuit 130 by recognizing changes in the voltage depending on the power consumption of the DC-end capacitor 150 in the discharging operation after the charging operation.

Figure 5:
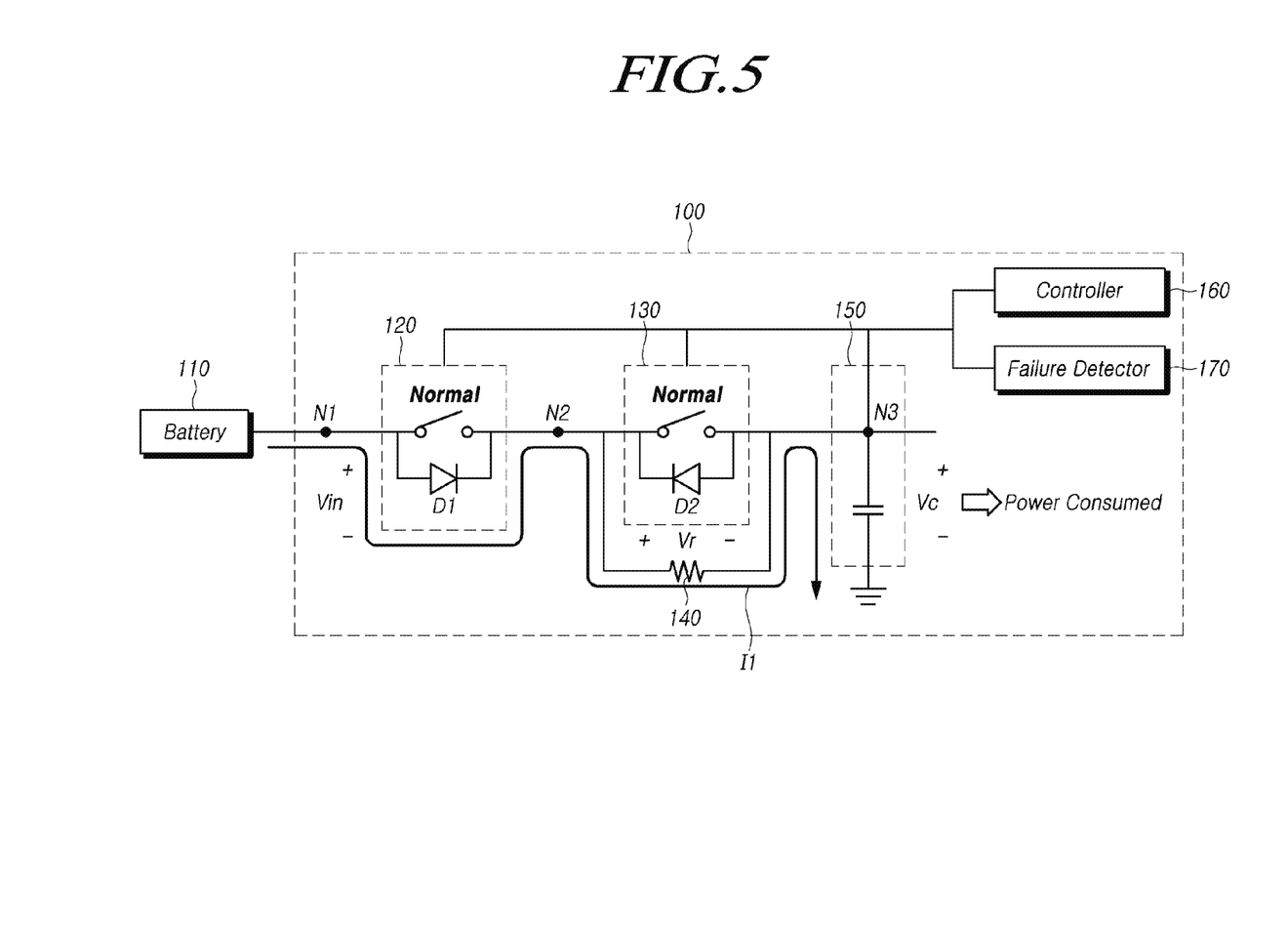
FIG. 5 illustrates the operation of the failure detector in a situation in which the switches of the reverse voltage protection circuit and the battery disconnect circuit according to an embodiment are in a normal state.

FIG. 5 illustrates the operation of the failure detector in a situation in which the switches of the reverse voltage protection circuit and the battery disconnect circuit according to an embodiment are in a normal state.

Referring to FIG. 5, in a case in which the switches of the reverse voltage protection circuit 120 and the battery disconnect circuit 130 are in a normal state, if the DC-end capacitor 150 consumes electric power in the discharging operation, the voltage of the DC-end capacitor 150 may drop. In this case, the failure detector 170 may determine that the switches of the reverse voltage protection circuit 120 and the battery disconnect circuit 130 are in a normal state.

Specifically, the failure detector 170 according to an embodiment may recognize changes in the voltage of the DC-end capacitor 150 after the turned-off state of the reverse voltage protection circuit 120 and the battery disconnect circuit 130 is maintained. In a case in which the switch is in a normal state, the switch is in an open state by performing the function thereof. In this case, the separation performed in the discharging operation can be continuously maintained.

However, nevertheless, the initial charge resistor 140, connected to the battery disconnect circuit 130 in parallel, is constantly connected to the DC-end capacitor. Thus, the battery 110 and the DC-end capacitor 150 may be electrically connected, even after the separation step is completed. That is, even though the switch M1 of the reverse voltage protection circuit 120 is turned off and opened by the controller 160, the diode D1, connected to the switch in parallel, may be connected to the first node N1 and the second node N2 in a forward direction, such that a current I1 can flow from the first node N1 to the second node N2. In addition, the switch M2 of the second node N2 and the third node N3 may be opened, and the diode D2 is connected in a reverse direction. Even in the case that the current I1 does not flow through the battery disconnect circuit 130, the current I1 may flow between the second node N2 and the third node N3, since the initial charge resistor 140 may be connected to the battery disconnect circuit 130 in parallel.

However, the constantly-connected initial charge resistor 140 should have a large resistance value, since the function thereof is to prevent inrush current. If the DC-end capacitor 150 uses the current I1 induced from the battery 110, both ends of the initial charge resistor 140 experience a voltage drop Vr corresponding to a value obtained by multiplying the current I1 with the resistance value of the initial charge resistance. As a result, the voltage Vc, output from the DC-end capacitor 150, may have a significant voltage drop compared to the voltage Vin input from the battery 110. That is, in a case in which the DC-end capacitor 150 consumes electric power, the voltage Vc of the DC-end capacitor 150 may have a significant voltage drop proportional to the magnitude of the initial charge resistance.

As described above, according to an embodiment, in a case in which a voltage drop occurs in the DC-end capacitor while the discharging operation is being performed during the predetermined detection period after the charging operation, it may be determined that a turn-off function has been performed due to the operation of the switches of the reverse voltage protection circuit 120 and the battery disconnect circuit 130. The failure detector 170 may determine that the switches of the reverse voltage protection circuit and the battery disconnect circuit are in a normal state. That is, it can be appreciated that, when the voltage of the DC-end capacitor 150 drops due to the power consumption, the switches of the reverse voltage protection circuit 120 and the battery disconnect circuit 130 are not short-circuited, and thus, the functions of the reverse voltage protection circuit 120 and the battery disconnect circuit 130 are properly maintained. Accordingly, in this case, the failure detector 170 may reliably determine that the reverse voltage protection circuit 120 and the battery disconnect circuit 130 are in a normal state.

In addition, the voltage drop of the DC-end capacitor 150 according to an embodiment may be determined on the basis of the value of voltage of the DC-end capacitor charged in the charging operation, at a predetermined ratio. In this case, the predetermined ratio may be determined depending on the amount of electric power of the DC-end capacitor 150 consumed in the discharging operation. In this regard, the amount of electric power, capacitance, the state of charge of the DC-end capacitor 150, the resistance of the initial charge resistor 140, the information regarding the voltage of the battery 110, and the like, may be used. As a specific example, the predetermined ratio may be set to be 100% of the input voltage. In this case, when the voltage of the DC-end capacitor 150 is 0, the DC-end capacitor 150 is entirely discharged, so that the switches of the reverse voltage protection circuit 120 and the battery disconnect circuit 130 may be determined to be in a normal state. In another example, the predetermined ratio may be set to be 50% of the input voltage. In this case, when the voltage of the DC-end capacitor 150 is reduced to be equal to or smaller than the half of the input voltage, the switches of the reverse voltage protection circuit 120 and the battery disconnect circuit 130 may be determined to be in a normal state. As described above, the predetermined ratio may be set to exceed 0% and be equal to or smaller than 100%, depending on the amount of electric power of the DC-end capacitor 150 consumed in the discharging operation.

In addition, the predetermined detection period according to an embodiment may be a predetermined value set by the operator. Here, the predetermined detection period may vary depending on the current state of the vehicle, e.g. information regarding the state of the battery, the vehicle speed, a failure of another device, and the like. In addition, the predetermined detection period may be a shortest period in which the predetermined voltage drop of the DC-end capacitor 150, as described above, is recognizable. In this case, information regarding the amount of power consumption per hour of the DC-end capacitor 150 consumed in the discharging operation, instant power, the capacitance of the DC-end capacitor 150, the state of charge, the resistance of the initial charge resistor 140, the voltage of the battery 110, and the like, may be used in order to determine the amount of electric power consumed.

In addition, since the shortest period in which the voltage drop is recognizable may be determined using other information regarding the DC-end capacitor 150 and the controller 160, the information used to determine the shortest period is not limited to the amount of power consumption per hour of the DC-end capacitor 150, instant power, the capacitance of the DC-end capacitor 150, and the state of charge. That is, there is no limitation on the predetermined detection period as long as the detection period can be a reference period for failure detection.

Accordingly, if the voltage drop of the DC-end capacitor 150 is equal to or greater than the predetermined ratio of the input voltage of the battery 110, the failure detector 170 according to an embodiment can determine that the switches of the reverse voltage protection circuit 120 and the battery disconnect circuit 130 are in a normal state.

Accordingly, the failure detector 170 can recognize a change in the voltage in response to the electric power of the DC-end capacitor 150 being consumed in the discharging operation after the charging operation, and can determine a failure in the switches of the reverse voltage protection circuit 120 and the battery disconnect circuit 130.

As described above with reference to FIGS. 1 to 5, embodiments of the present disclosure can provide the failure diagnosis function without using a separate charge/discharge circuit differently from the related art and thus simplify the circuit, thereby reducing costs and a board size. In addition, the simplified structure can improve reliability.

Hereinafter, a control method for power supply to an EPS system in a vehicle, able to realize all of the foregoing embodiments, will be described with reference to the drawings.

Figure 6:
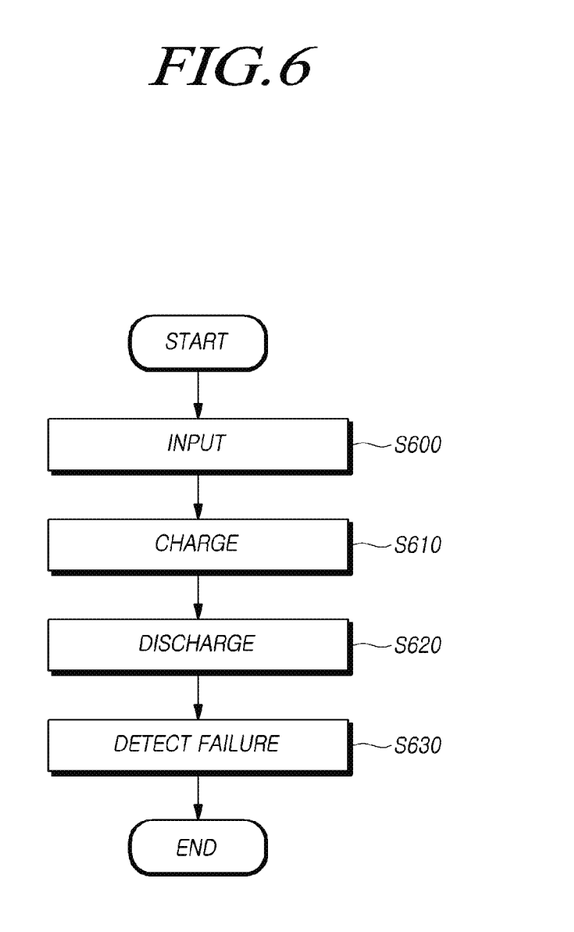
FIG. 6 is a flowchart illustrating a control method for power supply to an EPS system in a vehicle according to an embodiment.

FIG. 6 is a flowchart illustrating a control method for power supply to an EPS system in a vehicle according to an embodiment.

The control method for power supply to an EPS system in a vehicle according to an embodiment may include an input step, a charging step, a discharging step, and a failure detection step. In the input step, electric power is input from the vehicle battery. In the charging step, the DC-end capacitor is charged by turning on the switch of the reverse voltage protection circuit able to prevent the application of a reverse voltage of the vehicle battery and the switch of the battery disconnect circuit able to electrically disconnect the battery and the vehicle. In the discharging step, the DC-end capacitor is discharged by turning off the switch of the reverse voltage protection circuit and the switch of the battery disconnect circuit to electrically disconnect the DC-end capacitor and the battery and then consuming electric power of the DC-end capacitor. Changes in the voltage of the DC-end capacitor due to the discharging step after the charging step are detected, and on the basis of information regarding the changes in the voltage of the DC-end capacitor, a failure in the switches of the reverse voltage protection circuit and the switch of the battery disconnect circuit is detected. In addition, a step for performing the above-described steps in a stepwise manner may be further included. Some of the steps may be omitted or the sequences of some steps may be changed.

In the circuit in which the control method for power supply to an EPS system in a vehicle is used, the battery is connected to the reverse voltage protection circuit in series, and the reverse voltage protection circuit and the battery disconnect circuit are connected in series. The initial charge resistor, preventing circuits from being damaged by an inrush current induced when the switches are turned on, is connected to the reverse voltage protection circuit in series and to the battery disconnect circuit in parallel. The DC-end capacitor is connected to the battery disconnect circuit and the initial charge resistor in series. The DC-end capacitor may be connected to an external inverter, a gate driver for operating the inverter, or the like, in order to consume electric power. In this case, the external inverter may be connected to the DC-end capacitor in parallel, and may serve as a power source to control a vehicle motor using energy input from the DC-end capacitor.

Referring to FIG. 6, in the input step S600 of the control method for power supply to an EPS system in a vehicle according to an embodiment, electric power may be input from the vehicle battery.

In addition, in the charging step S610 of the control method for power supply to an EPS system in a vehicle according to embodiment, the switch of the reverse voltage protection circuit connected to the vehicle battery in series to prevent the application of a reverse voltage of the vehicle battery and the switch of the battery disconnect circuit connected to the reverse voltage protection circuit in series may be turned on to charge the DC-end capacitor connected to the battery disconnect circuit in series. In this case, when the switches of the reverse voltage protection circuit and the battery disconnect circuit are turned on, the switches can be short-circuited, thereby causing the both-end voltage of the DC-end capacitor and the both-end voltage of the vehicle battery to be the same. Accordingly, the DC-end capacitor can be charged.

That is, when the switch of the reverse voltage protection circuit is turned on, the corresponding switch is short-circuited, and potential differences of both ends of the reverse voltage protection circuit are the same. Likewise, when the switch of the battery disconnect circuit is turned on, the corresponding switch is short-circuited, and the potential differences of both ends of the battery disconnect circuit are the same. As a result, the voltage of the DC-end capacitor from the ground potential is the same as the voltage of the battery, so that the DC-end capacitor can be charged immediately.

Accordingly, after the charging step is completed, the voltage of the DC-end capacitor is the same as the voltage of the battery, irrespective of the voltage value of the DC-end capacitor directly before the charging step.

In addition, in the discharging step S620 of the control method for power supply to an EPS system in a vehicle, the switches of the reverse voltage protection circuit and the battery disconnect circuit and turned off and then charged electric power of the DC-end capacitor may be consumed in order to electrically disconnect the DC-end capacitor and the vehicle battery.

That is, in the discharging step, when the switch of the reverse voltage protection circuit is turned off, the corresponding switch is opened, and when the switch of the battery disconnect circuit is turned off, the corresponding switch is opened. Consequently, the DC-end capacitor and the vehicle battery can be electrically disconnected.

Afterwards, in the discharging step, a discharging operation may be performed by consuming electric power of the DC-end capacitor. In this regard, in the discharging step, an inverter connected to the DC-end capacitor or the gate driver for operating the inverter may be pseudo-driven. It should be understood, however, that the pseudo-driving of the inverter or the gate driver is merely illustrative of the use of electric power of the DC-end capacitor, and a method of driving the vehicle motor or driving another electronic control unit connectable to the DC-end capacitor may be used in order to consume electric power of the DC-end capacitor.

In this case, a change in the voltage of the DC-end capacitor varies depending on the failure of the reverse voltage protection circuit and the battery disconnect circuit. Thus, a change in the voltage of the DC-end capacitor may be detected in the failure detection step.

In addition, in failure detection step S630 of the control method for power supply to an EPS system in a vehicle, a change in the voltage of the DC-end capacitor due to the charging step after the charging step may be detected, and a failure in the switches of the reverse voltage protection circuit and the battery disconnect circuit may be determined on the basis of information regarding the voltage change of the DC-end capacitor.

This is because, for example, after the reverse voltage protection circuit and the battery disconnect circuit are turned off and the switches are opened, a current may be induced from the battery via the initial charge resistor when electric power of the DC-end capacitor is used, and changes in the voltage of the DC-end capacitor may have different aspects, depending on a failure in the reverse voltage protection circuit and the battery disconnect circuit. That is, if the switch has not failed, this is the same as the case in which the switch is opened, so that a voltage drop may occur in the DC-end capacitor. However, if the switch has failed, the switch is short-circuited, so that the voltage of the battery and the voltage of the DC-end capacitor may be maintained to be the same, and thus a voltage drop may not occur.

Accordingly, in the failure detection step, if the voltage of the DC-end capacitor is maintained at the voltage obtained in the charging operation even though the discharging operation has been performed for a predetermined detection period after the charging operation, it may be determined that the switches of the reverse voltage protection circuit and the battery disconnect circuit have failed.

In another example, in the failure detection step, if a voltage drop occurs in the DC-end capacitor during the discharging operation performed for a predetermined detection period after the charging operation, it may be determined that the switches of the reverse voltage protection circuit and the battery disconnect circuit are in a normal state.

In addition, the voltage drop in the DC-end capacitor according to an embodiment may be determined on the basis of the value of voltage of the DC-end capacitor, charged in the charging step, at a predetermined ratio. In this case, the predetermined ratio may be determined depending on the amount of electric power of the DC-end capacitor consumed in the discharging operation. In this regard, the amount of electric power, capacitance, the state of charge of the DC-end capacitor, the resistance of the initial charge resistor, the information regarding the voltage of the battery, and the like, may be used. As a specific example, the predetermined ratio may be set to be 100% of the input voltage. In this case, when the voltage of the DC-end capacitor is 0, the DC-end capacitor is entirely discharged, so that the switches of the reverse voltage protection circuit and the battery disconnect circuit may be determined to be in a normal state. In another example, the predetermined ratio may be set to be 50% of the input voltage. In this case, when the voltage of the DC-end capacitor is reduced to be equal to or smaller than the half of the input voltage, the switches of the reverse voltage protection circuit and the battery disconnect circuit may be determined to be in a normal state. As described above, the predetermined ratio may be set to exceed 0% and be equal to or smaller than 100%, depending on the amount of electric power of the DC-end capacitor consumed in the discharging operation.

In addition, the predetermined detection period according to an embodiment may be a predetermined value set by the operator. Here, the predetermined detection period may vary depending on the current state of the vehicle, e.g. information regarding the state of the battery, the vehicle speed, a failure of another device, and the like. In addition, the predetermined detection period may be a shortest period in which the predetermined voltage drop of the DC-end capacitor, as described above, is recognizable. In this case, information regarding the amount of power consumption per hour of the DC-end capacitor consumed in the discharging step, instant power, the capacitance of the DC-end capacitor, the state of charge, the resistance of the initial charge resistor, the voltage of the battery, and the like, may be used in order to determine the amount of electric power consumed. In this case, since the shortest period in which the voltage drop is recognizable may be determined using other information regarding the DC-end capacitor and the controller, the information used to determine the shortest period is not limited to the amount of power consumption per hour of the DC-end capacitor, instant power, the capacitance of the DC-end capacitor, and the state of charge. That is, there is no limitation on the predetermined detection period as long as the detection period can be a reference period for the failure detection.

As set forth above, the input step, the charging step, the discharging step, and the failure detection step of the control method for power supply to an EPS system of a vehicle may be provided as one or more microprocessors operating according to a set program. The set program may include a series of instructions to perform respective components of the reverse voltage protection circuit and the battery disconnect circuit of the control device for power supply to an EPS system of a vehicle according to an embodiment of the principle of the present disclosure as described above.

The terms used herein, such as "system," "processor," "controller," "component," "module," "interface," "model," and "unit," may generally mean computer-related hardware entities, a combination of hardware and software, a software application, or a software application being executed. For example, the above-described components may be one selected from among, but are not limited to, processor-executable processes, a processor, a controller, a control processor, individuals, executable threads, a program, or a computer. For example, an application being executed by a controller or a processor, as well as the controller or the processor, may be a component. One or more components may be present in at least one of the processor or the execution thread. A component may be located in a single system or may be distributed across two or more systems.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A control device for power supply to an electric power steering system in a vehicle, comprising:
    a reverse voltage protection circuit connected to a vehicle battery in series to prevent application of a reverse voltage of the vehicle battery;
    a battery disconnect circuit connected to the reverse voltage protection circuit in series, and able to electrically disconnect the vehicle battery and the vehicle;
    an initial charge resistor connected to the reverse voltage protection circuit in series and connected to the battery disconnect circuit in parallel to prevent damage caused by an inrush current occurring in response to a switch of the reverse voltage protection circuit and a switch of the battery disconnect circuit being turned on;
    a DC-end capacitor connected to the battery disconnect circuit and the initial charge resistor in series to accumulate power, supplied from the vehicle battery, as electrical energy;
    a controller controlling turning on and turning off of the switches of the reverse voltage protection circuit and the battery disconnect circuit and controlling charging and discharging operations of the DC-end capacitor; and
    a failure detector detecting a change in a voltage of the DC-end capacitor in response to the discharging operation after the charging operation and determining a failure in the switches of the reverse voltage protection circuit and the battery disconnect circuit in accordance with information regarding the change in the voltage of the DC-end capacitor.

2. The control device according to claim 1, wherein the charging operation charges the voltage of the DC-end capacitor by turning the switches of the reverse voltage protection circuit and the battery disconnect circuit on, and
    the discharging operation discharges the voltage of the DC-end capacitor by turning the switches of the reverse voltage protection circuit and the battery disconnect circuit off to electrically disconnect the DC-end capacitor and the vehicle battery and then consuming electric power of the DC-end capacitor.

3. The control device according to claim 1, wherein the controller controls the discharging operation to be performed for a predetermined detection period after the charging operation, and
    when the voltage charged in the charging operation is maintained in the DC-end capacitor during the discharging operation, the failure detector determines that the switches of the reverse voltage protection circuit and the battery disconnect circuit have failed.

4. The control device according to claim 1, wherein the controller controls the discharging operation to be performed for a predetermined detection period after the charging operation, and
    when a voltage drop occurs in the DC-end capacitor during the discharging operation, the failure detector determines that the switches of the reverse voltage protection circuit and the battery disconnect circuit are in a normal state.

5. The control device according to claim 4, wherein the voltage drop of the DC-end capacitor is determined from a voltage value of the DC-end capacitor charged in the charging operation, at a predetermined ratio.

6. The control device according to claim 5, wherein the predetermined detection period is a shortest period in which the voltage drop of the DC-end capacitor is recognizable.

7. A control method for power supply to an electric power steering system in a vehicle, comprising:
    receiving electric power from a vehicle battery;
    charge a DC-end capacitor by turning on a switch of a reverse voltage protection circuit able to prevent application of a reverse voltage of the vehicle battery and a switch of a battery disconnect circuit able to electrically disconnect the vehicle battery and the vehicle;
    discharging the DC-end capacitor by turning the switch of the reverse voltage protection circuit and the switch of the battery disconnect circuit off to electrically disconnect the DC-end capacitor and the vehicle battery and then consuming electric power of the DC-end capacitor; and
    detecting changes in a voltage of the DC-end capacitor due to the discharging after the charging and detecting a failure in the switch of the reverse voltage protection circuit and the switch of the battery disconnect circuit in accordance with information regarding the changes in the voltage of the DC-end capacitor.

8. The control method according to claim 7, wherein the discharging is performed for a predetermined detection period after the charging, and
    in the detection of the failure, if the voltage charged in the charging operation is maintained in the DC-end capacitor during the discharging operation, the switch of the reverse voltage protection circuit and the switch of the battery disconnect circuit are determined to have failed.

9. The control method according to claim 7, wherein the discharging is performed for a predetermined detection period after the charging, and
    in the detection of the failure, if a voltage drop occurs in the DC-end capacitor during the discharging, the switch of the reverse voltage protection circuit and the switch of the battery disconnect circuit are determined to be in a normal state.

10. The control method according to claim 9, wherein the voltage drop of the DC-end capacitor is determined from a voltage value of the DC-end capacitor charged in the charging, at a predetermined ratio.

11. The control method according to claim 10, wherein the predetermined detection period is a shortest period in which the voltage drop of the DC-end capacitor is recognizable.

* * * * *